United States Patent [19]

Wilding et al.

[11] Patent Number: 5,405,158

[45] Date of Patent: Apr. 11, 1995

[54] VARIABLE RATIO BELT DRIVE SYSTEM

[76] Inventors: Brian Wilding, 153 Fleetwood Crescent, Brampton, Ontario L6T 2E6; William Stellings, 249 Elizabeth Street, South, Brampton, Ontario L6Y 1S2, both of Canada

[21] Appl. No.: 126,853

[22] Filed: Sep. 27, 1993

[51] Int. Cl.$^6$ ............................................. B62M 9/06
[52] U.S. Cl. ..................................... 280/261; 474/20; 474/29; 474/37
[58] Field of Search ..................... 280/261, 260, 259; 180/220, 231, 230; 474/17, 20, 23, 24, 25, 27, 29, 30, 31, 37

[56] References Cited

U.S. PATENT DOCUMENTS

| | | | |
|---|---|---|---|
| 3,837,234 | 9/1974 | Chao | 474/29 |
| 4,116,080 | 9/1978 | Berens | 474/31 X |
| 4,119,326 | 10/1978 | Porter | 424/29 X |
| 4,398,899 | 3/1983 | Wood et al. | 474/37 |
| 4,743,041 | 5/1988 | Vazin | 280/236 |
| 4,781,656 | 11/1988 | Brackett et al. | 474/29 |

*Primary Examiner*—Margaret A. Focarino
*Assistant Examiner*—Kevin Hurley

[57] ABSTRACT

A drive system suitable for a bicycle and capable of providing various drive ratios comprising first and second pairs of conical members, each pair including primary and secondary conical members, both of which are rotatable about a first or second transverse axis. The conical members each comprise a series of evenly spaced sectors with the sectors of the primary conical member being slidable between the sectors of the secondary conical member in each pair. There is a first shaft for rotating the first pair of conical members. The primary conical member of the first pair is slidably mounted on the first shaft. The secondary conical member of the first pair is fixedly mounted on the first shaft. The conical members of the second pair are mounted on a second shaft. The secondary conical member of the second pair is mounted for axial sliding movement relative to the primary conical member. A continuous V-shaped drive belt extends about both pairs of conical members. A control mechanism is used to simultaneously cause relative sliding movement of both pairs of conical members whereby the annular region of engagement between the drive belt and each pair of conical members can be varied.

23 Claims, 7 Drawing Sheets

VARIABLE RATIO BELT DRIVE SYSTEM

BACKGROUND OF THE INVENTION

This invention relates to a drive system capable of providing various drive ratios and to a bicycle employing such a drive system.

Multi-speed bicycles are well known and have been in use for a number of years. One common type of multi-speed bicycle employs a derailer system used in conjunction with a number of sprockets to provide a number of "speeds" or drive ratios. Typically, for example, in a known ten speed bicycle, there are two sprockets of different sizes for a chain drive mounted on the pedal drive axle and five sprockets of varying size mounted on the axle for the rear wheel. The derailer permits the drive chain of the bicycle to be moved from one sprocket to another either at the location of the pedal drive or at the axle for the rear wheel.

Although the known drive systems for a multi-speed bicycle work reasonably well, there are several known and apparent difficulties with them. Firstly, they require the use of a number of metal sprockets and a metal drive chain and these require the use of messy lubricants which are prone to collect dirt. The known mechanism can cause damage to clothing which can get caught in the mechanism. The mechanism employs a multiplicity of moving and sometimes delicate parts which can break or stretch or fail from time to time. This mechanism is not aerodynamic which can be important in some bicycles, particularly those designed for racing. Because the various parts are made of metal, they can be relatively expensive to manufacture and the parts are subject to rust or oxidation. The known multi-speed drive system also generally requires that a standard spoked bicycle wheel, including tube and tire, be used.

Drive systems which employ V-shaped belts are also known for a variety of applications but, as far as the applicant is aware, such drive systems have never been employed to provide a multi-speed or variable speed drive suitable for a bicycle. One advantage of these drive systems is that they employ a reinforced rubber or synthetic rubber belt which can be manufactured at a reasonable cost and which does not require the use of greasy and messy lubricants.

It would be advantageous to provide a variable speed drive suitable for a bicycle that is relatively simple in its construction and that can be manufactured at a lower cost than the existing known multi-speed drive systems. Preferably, such a drive system would be made with parts or components that would be primarily or substantially non-metallic and that would employ materials such as inexpensive plastics, composites or ceramics. Drive system components made of plastics or ceramics are non-corroding, non-rusting, and easier to recycle.

It is an object of the present invention to provide a new and relatively inexpensive drive system capable of providing various drive ratios and employing a continuous V-shaped drive belt in combination with first and second pairs of members that engage this drive belt and that are conical on one side.

It is a further object of the present invention to provide a relatively inexpensive drive system capable of providing various drive ratios wherein major components thereof can be made of inexpensive non-metallic materials such as plastics. In at least one form thereof, the drive system is suitable for use on a bicycle.

SUMMARY OF THE INVENTION

According to one aspect of the invention, a drive system capable of providing various drive ratios comprises first and second pairs of conical members, each pair including primary and secondary conical members both of which are rotatable about a first or second transverse axis. The conical members each comprise a series of evenly spaced sectors with the sectors of the primary conical member being slidable between the sectors of the secondary conical member in each pair. Each conical member is formed with side-by-side parallel grooves that extend radially. A first shaft is used to rotate the first pair of conical members with at least one of the first pair of conical members being connected for rotation with this shaft. There are means for mounting the secondary conical member of the first pair for sliding movement relative to the first shaft along the first transverse axis. A second shaft has an axial center line that is aligned with the second transverse axis and at least one of the second pair of conical members is mounted on this second shaft. There are also means for mounting the second pair of conical members for sliding movement relative to one another along the second transverse axis. A continuous V-shaped drive belt extends about both pairs of conical members. The belt is formed with side-by-side parallel grooves that are perpendicular to the length of the drive belt and mate with and engage the grooves on the conical members. A control mechanism is capable of simultaneously causing relative sliding movement of the first and second pairs of conical members whereby an annular region of engagement between the drive belt and the first pair of conical members can be increased in circumference while an annular region of engagement between the drive belt and the second pair of conical members can be correspondingly decreased by suitable operation of the control mechanism and vice versa.

According to another aspect of the invention, a bicycle comprises a rigid frame including a steering post arranged forwardly on the frame, a steerable front wheel, and means for rotatably mounting the front wheel to the frame including a steering spindle pivotally mounted in the steering post. A rear wheel is rotatably mounted on the frame. There is also a foot powered drive mechanism for the rear wheel including a first rotatable shaft extending transversely to the frame, a pair of conical drive members, including a primary conical drive member that is connected to the first shaft and rotated thereby about a first transverse axis, and a secondary conical drive member extending around the first shaft and coaxial therewith. The conical drive members each comprise a series of evenly spaced sectors with the sectors on one conical member being slidable between the sectors of the other conical member. There is also a rear shaft by which the rear wheel is mounted on the frame. A driven conical mechanism is connected to the rear wheel for rotating same, this mechanism including a driven conical member rotatably mounted on the rear shaft and slidable relative to the rear shaft along a second transverse axis and a conical part connected to the rear wheel and coaxial therewith. The driven conical member and the conical part each comprise a series of evenly spaced sectors with the sectors of the driven conical member being slidable between the sectors of the conical part. A continuous V-shaped drive belt extends about the pair of conical drive members and the driven conical mechanism. A control mechanism for simultaneously causing relative sliding movement of the pair of conical drive members and the driven conical mechanism is also provided. With this control mechanism, the effective circumference of the pair of conical drive members for engagement with the drive belt can be increased while the effective circumference of the driven conical mechanism for engagement with the drive belt can be correspondingly decreased and vice versa. Thus, a variable drive for the bicycle is provided by the conical drive members and the conical mechanism.

In a preferred embodiment, the drive belt is hollow and contains fibre reinforcements in walls forming sides of the drive belt. One preferred control mechanism includes first and second control cables connected respectively to one of the conical drive members and one of the driven conical member and the conical part and a single lever control member connected to one end of each control cable. This control member is pivotally mounted on an upper portion of the bicycle.

Further features and advantages will become apparent from the following detailed description taken in conjunction with the drawing.

DETAILED DESCRIPTION OF PREFERRED EMBODIMENTS

Figure 1:
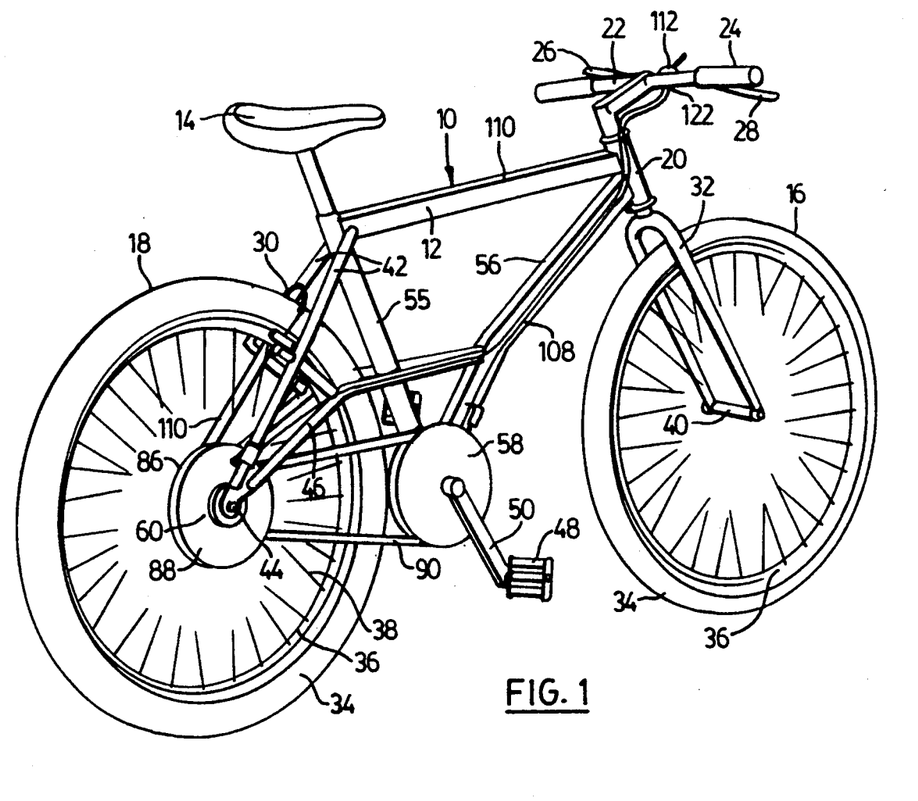
FIG. 1 is a perspective view of a bicycle equipped with a drive system constructed in accordance with the invention.

In FIG. 1 there is shown a bicycle 10 having a rigid frame 12 of a suitable design for the present invention. Mounted on the frame is a seat 14, a steerable front wheel 16 and a driven rear wheel 18. The frame includes the usual steering post 20 at the front and located above this post are the handlebars 22 which provide means for steering the front wheel. Located at the end of these bars are handles 24 and adjacent these handles are mounted two hand brake levers 26 and 28. These levers are connected by suitable cables (not shown) to standard front and rear brakes with only the rear brakes 30 shown in FIG. 1 for ease of illustration.

It will be understood that the front wheel 16 is rotatably mounted on a pair of forks 32 which in turn are connected to a standard steering spindle (not shown) pivotally mounted in the steering post 20. The top end of the spindle is connected to the handlebars 22.

Figure 10:
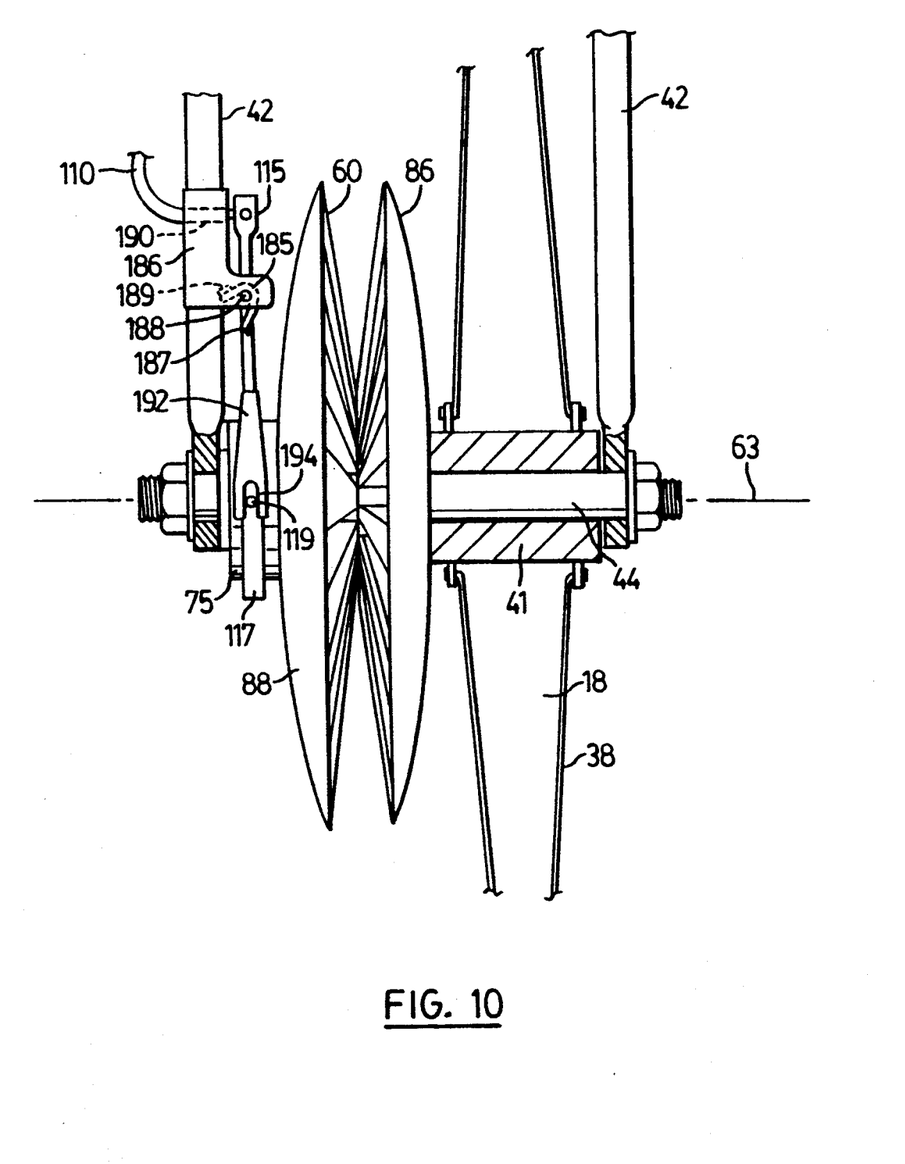
FIG. 10 is a detail view, partly in cross-section, showing a pair of conical members mounted on a fixed shaft about which the rear wheel rotates.

Except for differences noted hereinafter, the front and rear wheels can be of standard construction as shown in FIG. 1 or they can be of a special solid-disc construction as explained hereinafter. In the embodiment of FIG. 1, each wheel includes a rubber tire 34 which can contain a tube. The tire is mounted on a steel rim 36 to which a number of spokes 38 are connected. The inner ends of the spokes 38 are connected to a sleeve member which is free to rotate about the front or rear axle. Only the front sleeve member 40 can be seen in FIG. 1. A rear sleeve member 41 is shown in FIG. 10.

The rear axle is mounted at the bottom of a pair of downwardly extending rear struts 42. Further support for the rear axle 44 is provided by horizontally extending struts 46 with one located on each side of the rear wheel.

Figure 4:
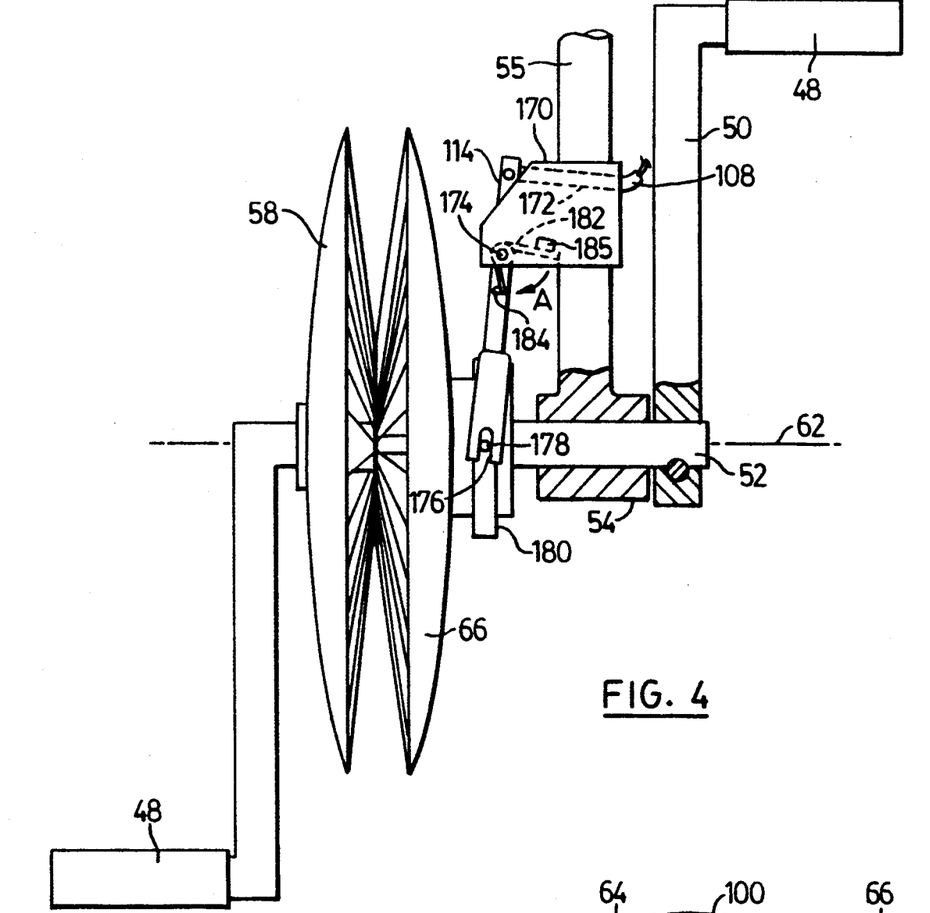
FIG. 4 is a detail view, partly in cross-section showing a pair of conical drive members mounted on the shaft to which the bicycle pedals are connected.

There are foot powered drive means for the rear wheel 18, the details of which can be seen from FIG. 4. As in the standard bicycle, there are two foot pedals 48 located on opposite sides of the bike. A crank or crank arm 50 is connected to each foot pedal. These feet operated cranks are rigidly connected to opposite ends of a first shaft 52 for rotating same. The shaft 52 is rotatably mounted in a short supporting sleeve 54 by means of the usual bearings (not shown). The sleeve 54 is rigidly connected to the bottom of frame members 55 and 56.

The bicycle 10 is equipped with a drive system constructed in accordance with the invention that is capable of providing various drive ratios. The drive system includes first and second pairs of conical members indicated generally at 58 and 60 in FIG. 1. Each pair includes primary and secondary conical members. The first pair 58 is rotatable about a first transverse axis indicated at 62 in FIG. 4. This axis is coaxial with the first shaft 52 and supporting sleeve 54. The second pair of conical members is rotatable about a second transverse axis 63 (see FIG. 10) that is parallel to the first transverse axis and coaxial with the rear or second shaft 44.

Figure 5:
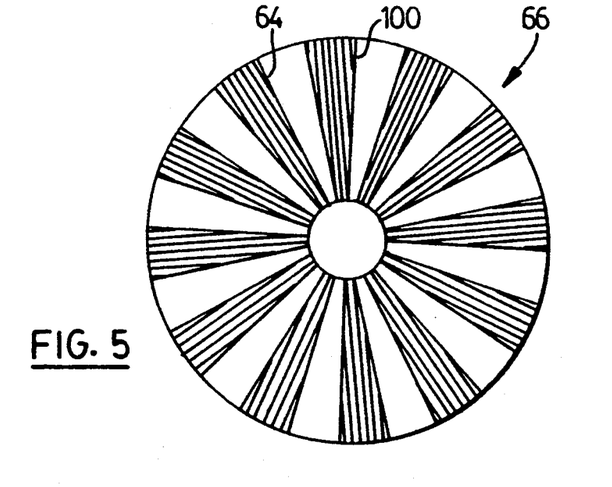
FIG. 5 is a detail view showing one of the conical drive members from the side thereof having evenly spaced sectors.
Figure 7:
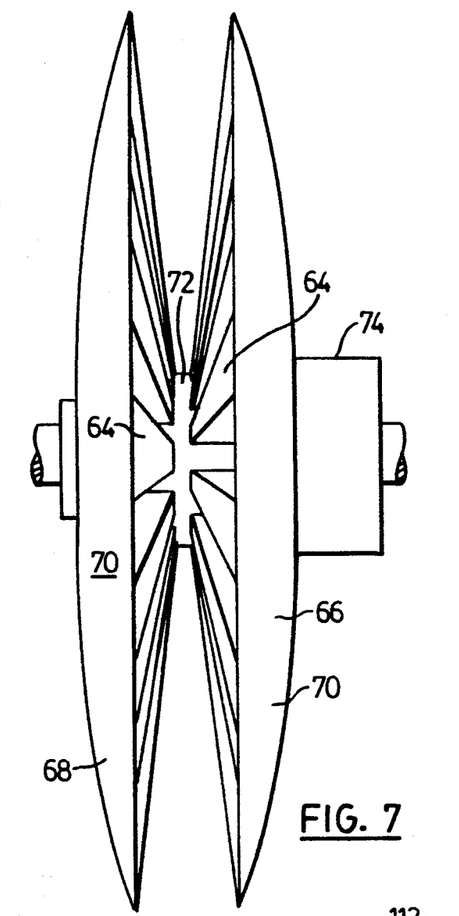
FIG. 7 is an edge view of a pair of conical drive members constructed in accordance with the invention, the members being shown in a position where they are spaced from one another.
Figure 9:
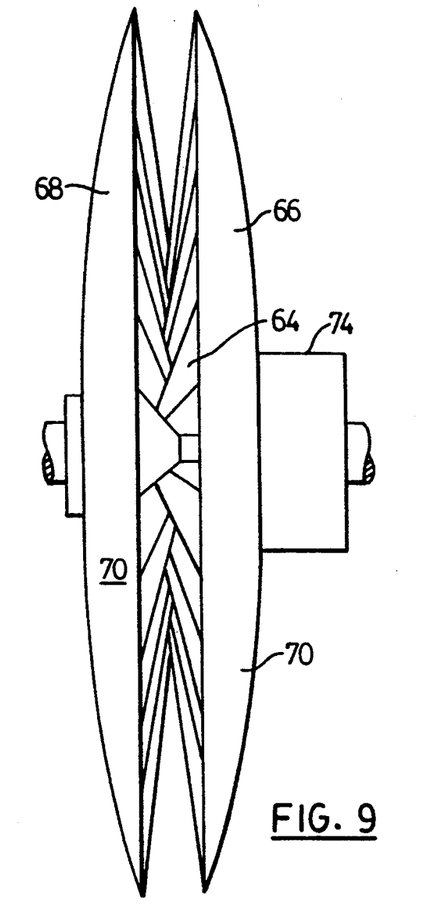
FIG. 9 is an edge view similar to FIG. 7 but showing the conical drive members in a position where the sectors of one conical member are positioned partway between the sectors of the other conical member.

The construction of these conical members will now be described with reference to FIGS. 5, 7 and 9. Each conical member comprises a series of evenly spaced sectors 64. The sectors of the primary conical member indicated at 66 in FIGS. 7 and 9 are slidable between the sectors of the secondary conical member 68 in each pair. These sectors are rigidly connected to a circular, dish-shaped outer section 70. In the illustrated preferred embodiment, the outer surface of each conical member is convex. Rigidly connected to each secondary conical member 68 is a short tubular member 72 that is coaxial with the first or second transverse axis. Also rigidly connected to the center of each primary conical member 66 is another short tubular member 74. The tubular member 72 has an external diameter the same as or smaller than the internal diameter of the tubular member 74 so as to permit the member 74 to slide axially on the member 72.

Figure 6:
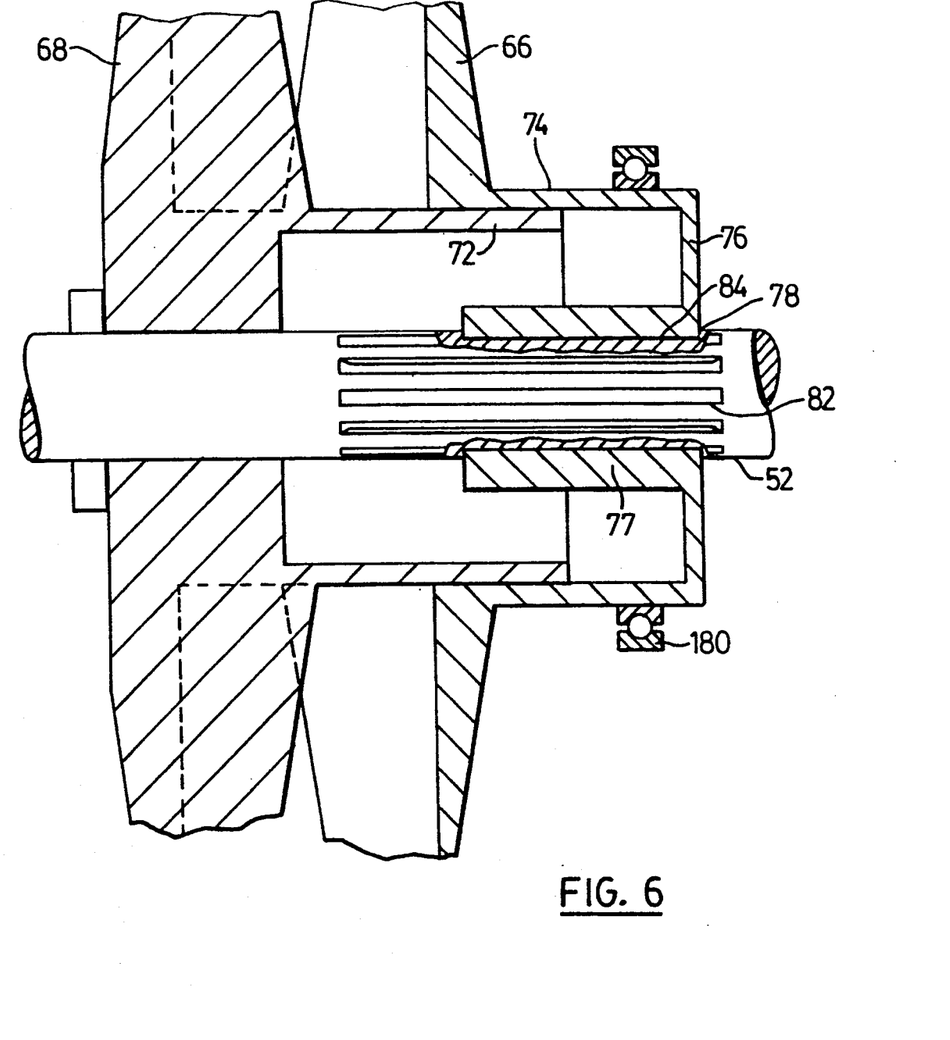
FIG. 6 is a detail view, partly in cross-section, showing the interior structure of the conical drive members of FIG. 4.

The tubular member 74, as shown in FIG. 6, has an inner end section 76 adjacent to the sleeve 54 that forms a circular opening at 78 of about the same diameter as the first shaft 52. Preferably there is an inner sleeve 77 which is rigidly connected to the end section 76 and slidable on the shaft 52. Because the two conical members 66 and 68 are never completely disengaged from one another, both conical members rotate with the shaft. There are means for fixedly mounting the secondary conical member 68 to the first shaft 52. A set screw or bolt (not shown) can be used for this purpose. If desired, the first shaft 52 can be provided with grooves at 82 and corresponding ribs or grooves are formed in the central passageway 84 of the conical member 66. The cooperation and engagement between the ribs on the conical member and the grooves on the shaft assist in the driving action, that is, they assist in transferring the driving force from the shaft 52 to the conical member 66.

It will be understood that the second pair of conical members 60 is constructed in a similar manner to the first pair of conical members illustrated in FIG. 4 and operates in a similar fashion. The second pair of conical members is mounted on the second or rear shaft 44 and its primary or inner conical member indicated at 86 in FIG. 1 is rigidly mounted to the rear sleeve 41 that rotates about the shaft 44. Connected to the outside of this tubular member are the spokes 38 of the rear wheel. The secondary or outer conical member 88 of the second pair is slidable on the rear axle and there are means for mounting the secondary conical member on the rear axle similar to the mounting means for the inner conical member shown in FIGS. 4 and 6.

Figure 2:
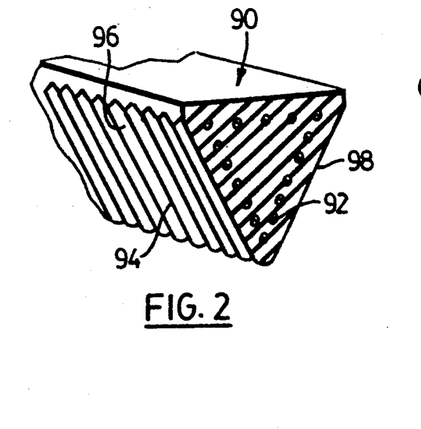
FIG. 2 is a perspective view of a section of a V-shaped drive belt suitable for use in the drive system of the invention, which view shows a transverse cross-section of the belt.

A continuous V-shaped drive belt 90 extends about both pairs of conical members 58 and 60 and is maintained under a suitable tension. As in known V-belts used in existing belt drives for automotive systems, the belt can be constructed from a rubber/polymer reinforced with strong fibres 92 that may be located near each surface of the belt as shown in FIG. 2. These fibres may comprise kevlar or similar strong material. Unlike the standard V-belt construction, the V-belt used in the drive system of the invention preferably is formed with side-by-side parallel grooves 94 that extend perpendicularly to the length of the drive belt. These grooves are formed on the two sides of the belt indicated at 96 and 98 in FIG. 2. When using this preferred form of belt, the aforementioned conical drive members of both pairs 58 and 60 are formed with side-by-side parallel grooves of similar configuration, these grooves 100 being illustrated in FIG. 5. These grooves 100 extend generally radially, but only approximately since the grooves formed on each sector are in fact parallel. It will be understood that the grooves formed on the drive belt and on the conical members enhance the interengagement between each pair of conical members and the drive belt and increase the ability of the drive system to transfer the rotating drive force from the pair of conical members to the drive belt or vice versa. At the same time because the grooves extend generally radially relative to the conical members, they do not interfere with the ability of the belt to move radially outwardly or radially inwardly with respect to the conical members as explained hereinafter.

Figure 3:
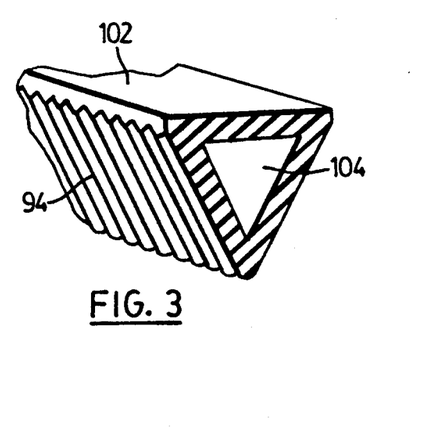
FIG. 3 is another perspective view of a V-shaped drive belt which can also be used in the drive system of the invention, this drive belt being hollow.

FIG. 3 illustrates a particularly preferred form of V-shaped drive belt. This drive belt 102 is hollow having a central cavity 104 which, as shown, has a triangular cross-section. This hollow drive belt has increased flexibility and, for this reason, will permit the belt to be moved radially inwardly or outwardly with respect to the adjacent conical members more easily than is the case with a solid drive belt such as that shown in FIG. 2. Thus a drive system in accordance with the invention employing a hollow drive belt may be easier to use from the standpoint of changing the drive ratio of the system. Whether the belt of FIG. 2 or that of FIG. 3 is used, the V-shaped belt should have some elasticity in its cross-sectional dimensions to make it easier to change the drive ratio of the system as explained hereinafter. However, the belt must return to its original shape after shifting of the drive ratio has been accomplished. Although not shown in FIG. 3, it will be understood that the hollow belt is preferably constructed with fibre reinforcements as well.

Figure 8:
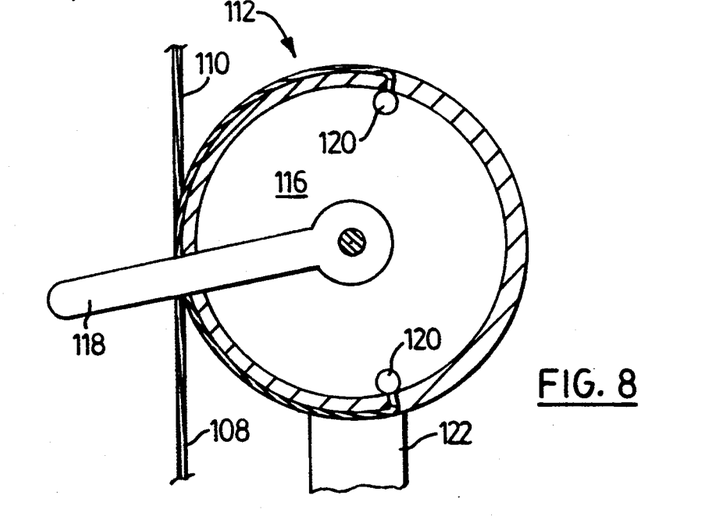
FIG. 8 is a detail view showing a single lever control member that can be used to operate the control cables connected to the conical drive members.

The two pairs of conical members are operated and controlled by a control mechanism which is illustrated in FIGS. 1, 4, 6, 8 and 10. This control mechanism is capable of simultaneously causing relative sliding movement of the first and second pairs of conical members whereby an effective circumference of the first pair of conical members 58 for engagement with the drive belt 90 is increased while an effective circumference of the second pair of conical members 60 is correspondingly decreased by suitable operation of the control mechanism and vice versa. Thus, a variable drive for the bicycle is provided by means of the two pairs of conical drive members. The control mechanism includes first control cable 108 and a second control cable 110. It will be appreciated that these control cables can be of standard construction and are similar to those used on existing, known bicycles to operate derailers. These cables should be strong enough to effect sliding movement of the conical members against a resisting force which can be created by the tension in the drive belt 90 itself. The cables can be assisted by coil springs as well as explained hereinafter. Typically, sections of the cable may run through plastic tubing in order to protect the cable and to enable its free, sliding movement. A single lever control member 112, the details of which are shown in FIG. 8, is connected to one end of each of the control cables. The control member 112 is preferably pivotally mounted on an upper portion of the bicycle as illustrated in FIG. 1. The outer end of cable 108 is connected to one end of a pivoting yoke member 114. The outer end of the cable 110 is connected to one end of another yoke member 115 that operates the outer conical member 88 by means of a thrust bearing 117 (see FIG. 10). The bearing 117 is preferably a Torrington bearing whose outer section (which has pin members 119 on opposite sides thereof) rotates on the tubular member 75 which is an outward extension of the conical member 88.

Returning to FIG. 4, there is mounted on the frame member 55 a pivot support or bracket 170. This bracket forms a cable guide or passageway 172 for the cable 108. The bracket supports a pivot pin or bolt member 174 about which the yoke member 114 pivots. The yoke member 114 is connected by means of two slots 176 to pin members 178 formed on opposite sides of thrust bearing 180. Again, the thrust bearing is preferably a Torrington bearing similar to those used as a clutch release bearing in automobiles. As the construction of such bearings is well known in the art, a detailed description thereof in the present application is deemed unnecessary. It will be understood that the yoke member 114 has two arms which extend down opposite sides of the thrust bearing to reach the pins 178. By pulling on the cable 108, one is able to pivot the yoke member 114 thereby forcing the inner conical member 66 inwardly. Preferably a coil spring 182 extending about the pivot pin 174 acts to bias the yoke member in the direction indicated by the arrow A in FIG. 4. One end of the spring 182 is connected to a connecting screw or pin 184 mounted in the side of the yoke member. The other end of the spring presses against or is held by support bar 185 which is part of the bracket 170. It will be understood that this spring 182 acts to reduce the amount of the pulling force required to be applied by the cable 108 to move the inner conical member 66 axially outwards. Thus, the spring acts to counterbalance the axially inward force on this conical member that results from the tension in the V-shaped belt.

As shown in FIG. 10, which shows the drive arrangement at the rear wheel, there is mounted on frame member 42 a small support bracket 186. This bracket supports a pivot pin or bolt 188 about which the yoke member 115 is able to pivot. The bracket 186 also forms a cable guide or passageway at 190 for the end section of control cable 110.

The yoke member 115 is constructed in a similar manner to the above described yoke member 114 and has two spaced apart arms 192 that reach down opposite sides of the thrust bearing 117. These arms are formed with slots 194 at their bottom ends to engage and hold the pins 119. This arrangement provides the means for pushing the outer conical member 88 inwardly. Again a coil spring 185 acts to reduce the amount of pulling force required to be applied by the cable 110 to move the conical member 88 inwardly. This spring extends about the pivot pin 188. One end of the spring is connected by a screw or pin 187 to the yoke member 115. The other end of the spring presses against or is held by a support bar 189 which is part of the bracket 186.

It will be understood that the control member 112 and its attached cables are mounted and arranged in such a manner that as one of the two cables is let out permitting its respective pair of conical members to spread out from one another, the other cable is drawn in causing its respective pair of conical members to come together.

With reference to FIG. 8, the illustrated control member comprises a control drum 116 to which is rigidly connected handle or lever 118. If desired, the periphery of the drum may be grooved to receive the adjacent sections of the control cables. Suitable slots 120 may be formed in opposite sides of the drum to receive and connect the ends of the control cables. It will be understood that the drum is rotatably mounted on a suitable post or bracket shown at 122 in FIGS. 1 and 8. This post or bracket is preferably connected to the handlebars so that there is easy access to the control drum in order to operate same.

It will be understood that the control drum is constructed in such a manner that its position as selected by the bicycle operator is maintained after the position has been selected. This can be accomplished by a variety of known mechanisms including a click/stop system, a two-way ratchet mechanism or a mechanical release mechanism (for example, permitting the disc to be rotated about its pivot pin only when the disk has been moved to a released position). As such ratchet systems and click/stop systems are well known, a detailed description thereof is deemed unnecessary for purposes of the present application. The size of the sectors 64 on the conical members in the circumferential direction can vary depending upon the particular application of the drive system. For purposes of a bicycle, the preferred sectors each extend through an arc of between 10 and 20 degrees. The arc should be large enough to provide adequate support for the drive belt and to maintain the proper curved shape of the drive belt around the conical members. Similarly, the size of the arc should not be so large that there is not adequate support for the drive belt from both sides around the effective circumference of the conical members.

The slope of the conical surface of each conical drive member that engages the drive belt can also vary to some extent depending upon the particular application of the drive system and also on the V-shaped drive belt to be used. For bicycle applications, it is preferred that the sectors of each drive member define a cone whose surface extends at an angle of between 45 and 85 degrees, more preferably 60 to 80 degrees, relative to the transverse axis extending through the centre of the drive member. A larger angle of inclination is preferred for bicycle applications because it enables conical members to be used which are not unduly thick in the axial direction and, at the same time, it permits the effective circumference created by the pair of conical members to be varied substantially, thus permitting a wide range of drive ratios.

Figure 11:
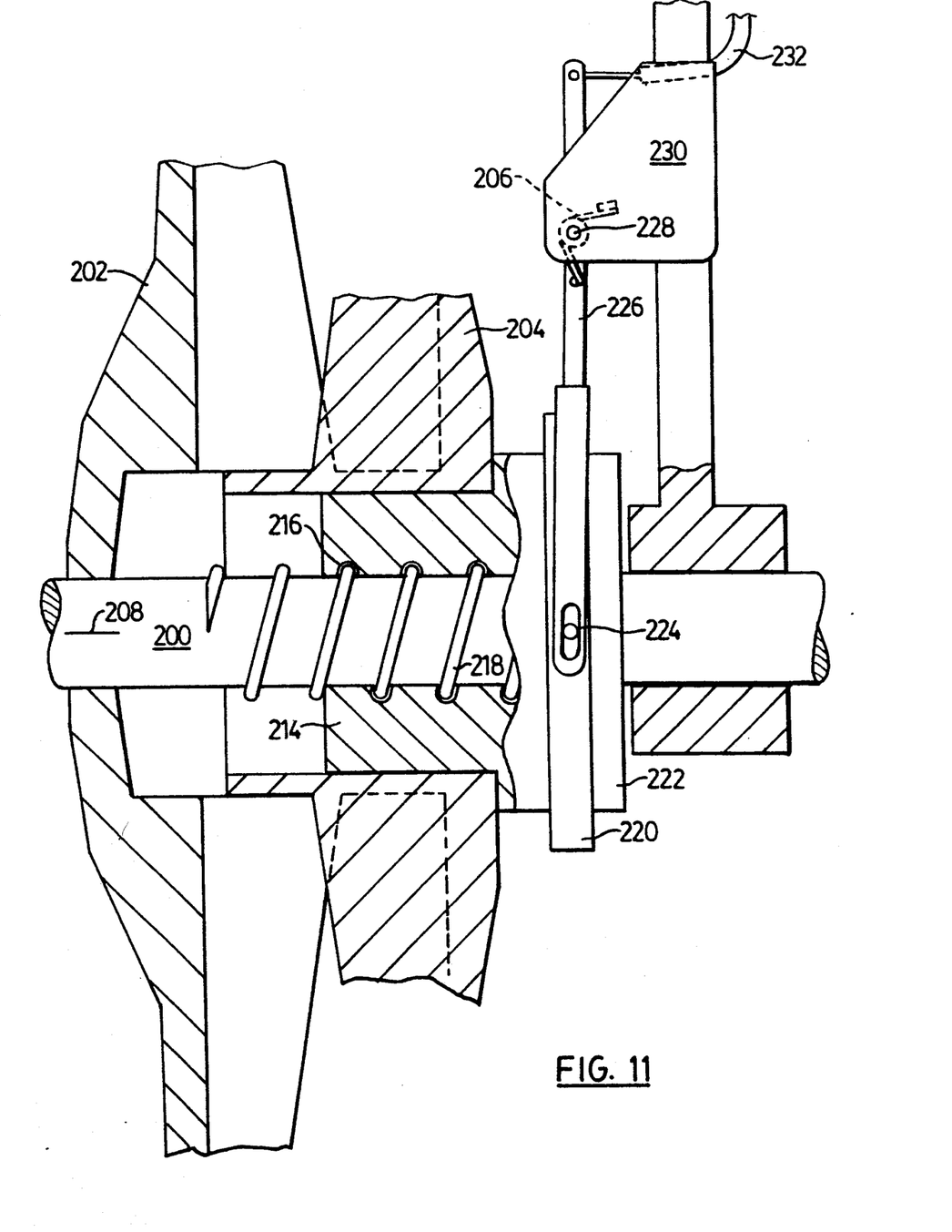
FIG. 11 is a detail view, partly in cross-section, illustrating a second embodiment of the invention employing a helical groove and rib arranged on the inner conical member and the pedal shaft respectively.

FIG. 11 illustrates a preferred embodiment of the invention which provides an automatic drive system capable of providing various drive ratios and, in particular, an automatic drive system suitable for use on a bicycle. FIG. 11 illustrates the preferred arrangement for a pair of conical members located on a drive shaft 200 which can be the pedal shaft of the bicycle. Except as explained hereinafter, the conical members 202 and 204 are constructed in the same manner as the conical members 66 and 68 illustrated in FIGS. 4 to 7 of the drawings. The conical member 204 is connected to a central support tube 214. The tube 214 is co-axial with the two conical members. This tube has a first helical engagement means 216 extending around an inner surface of the tube. In the illustrated preferred embodiment, this engagement means comprises a helical groove. To provide for long wear life and a suitable degree of friction, tube 214 is preferably a brass sleeve that is rigidly connected to the conical member 204.

There is also a second helical engagement means 218 formed on the shaft 200 and extending around its perimeter. In the illustrated preferred embodiment, this engagement means comprises a helical rib sized to fit snugly in the groove 216.

It will be understood that the helical groove 216 and the helical rib 218 are arranged and constructed so as to cause the first pair of conical members 202 and 204 to move away from one another with a suitable increase in torque applied to the shaft 200. This effect is caused by the increased torque overcoming the inherent frictional forces between the helical rib and the helical groove which are in close fitting engagement. However, when the torque applied to the shaft decreases, a coil spring at 206 engaging a yoke member 226 will cause the inner conical member to move outwardly.

In order that the pair of conical members at the rear wheel will operate in an opposite manner to the front conical members 202 and 204, there is a slave-type control mechanism operatively connected between the two pairs of conical members. By this mechanism, relative axial movement of the first pair of conical members 202 and 204 in one axial direction results in a similar but opposite relative axial movement of the second pair of conical members. This control mechanism is provided in part by means of a thrust bearing 220 mounted on tubular extension 222 of the conical member 204. Arranged on opposite sides of this bearing are two pins 224 which are arranged in respective slots of the yoke member 226. This yoke member is similar in its construction to the yoke member 114 shown in FIG. 4. It is pivotally mounted by means of a pivot pin 228 held by bracket 230. The spring 206 extends about the pin 228 and is supported thereby. Connected to the top of the yoke member is a suitable control cable 232. This control cable 232 can be connected to the two conical members at the rear wheel in the manner illustrated in FIG. 10. It will be understood that the rear conical members can be constructed in the same manner as the members 86 and 88 of the first embodiment.

The helical engagement mechanism at the pedal shaft will cause the front conical members to move apart, yielding a lower gear ratio when the torque applied to the pedal shaft is sufficiently high to overcome the frictional resistance. As the lower gear ratio is achieved, the torque applied to the pedal shaft will diminish and the relative sliding movement of the inner conical member will cease until the torque demand changes again. If the torque demand decreases sufficiently, the coil spring 206 will move the front conical members together to provide a higher gear ratio. This automatic drive system can be "tuned" to create a reasonably constant load on the pedals and a variable speed of the bike. When the torque demand increases (as in going up hill), the ratio automatically drops until the ratio balances the torque demands, resulting in a lowered speed. On the downhill side, the torque demand lessens and the ratio automatically increases in response.

It is also possible to have an "automatic" variable ratio drive system that employs the helical engagement means shown in FIG. 11 but which does not employ any connecting cable or similar slave-type mechanism between the front and rear conical members. This system would depend on the tension in the V-type drive belt itself to either cause the rear pair to separate further or to come closer together. In other words, a variation in the tension in the belt as a result of axial movement of the front conical members would result in a compensating axial movement of at least one of the rear conical members.

Figure 12:
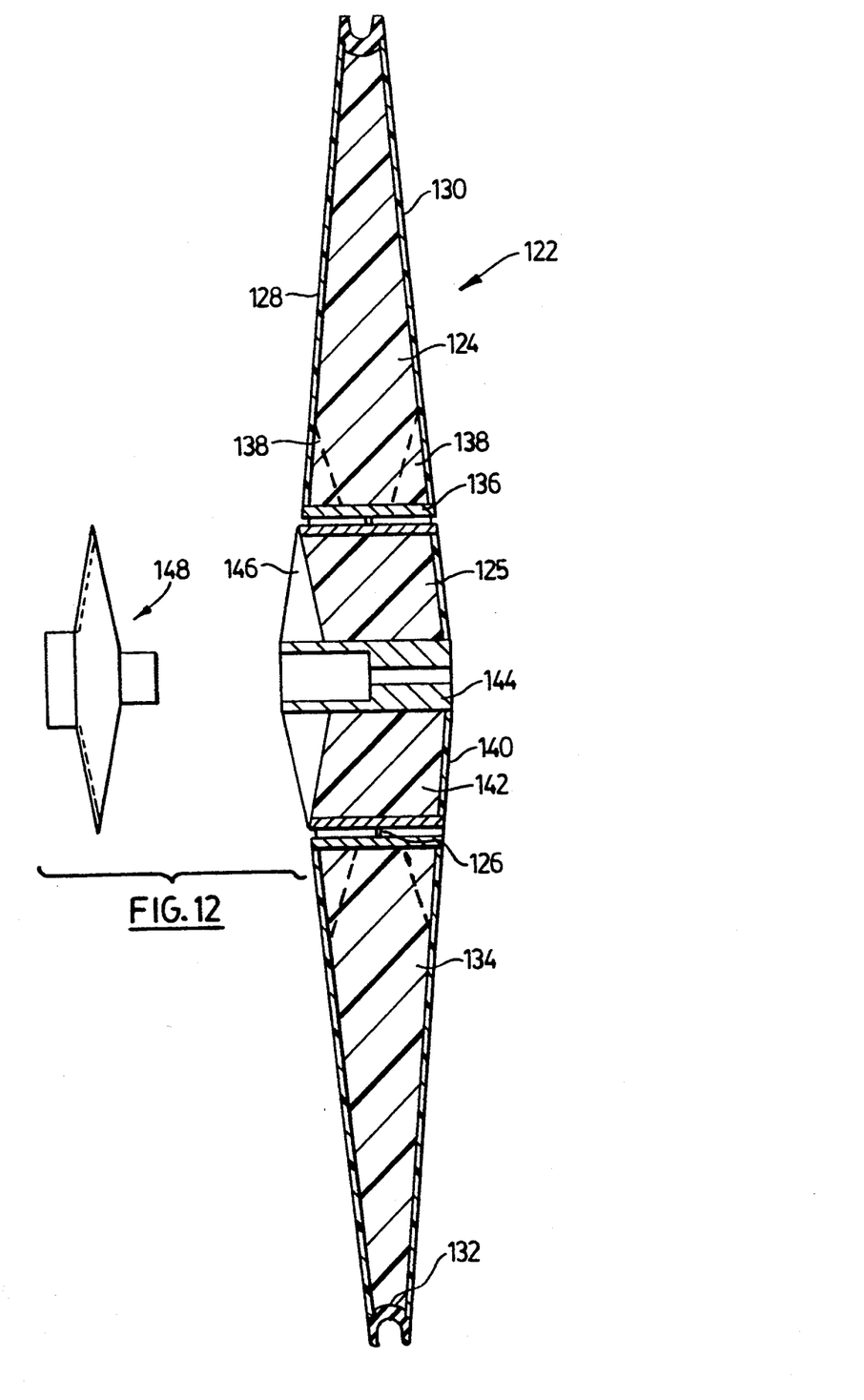
FIG. 12 is a diametrical cross-section of one form of rear wheel for a bicycle incorporating the variable belt drive system of the invention.

FIG. 12 illustrates a preferred form of solid rear wheel construction for a bicycle incorporating the drive system of this invention. This rear wheel can be made substantially from plastic and thus the cost of manufacture is low. The wheel 122 comprises an outer section 124 and an inner section 125 with the outer section being free to rotate in the forward direction relative to the inner section, thus permitting both coasting and driving with the rear wheel. The outer section 124 is rotatably mounted on the inner section by means of bearings and sprag bearings indicated at 126 which are of known construction per se. The outer section 124 comprises two outer, annular, tough plastic discs 128 and 130. Except in the region of the hub, the thickness of these discs can be 3/16th inch or less. They can be made with a slight curvature and, when they are attached to a rim member 132, they are bent slightly inwardly for stressing purposes. The annular rim member 132 can be an extruded plastic member that is cut to the required length and bent to form a complete circle. This member is generally U-shaped in cross-section and the periphery of the discs is connected to the rim member by a suitable adhesive.

On the inside of the rear wheel 122 can be a high density polyurethane (expanded polystyrene) core 134. The core is of tapered construction with the innermost region having the greatest thickness. Located between the core and the bearings is a short plastic tube 136 which can be made of the same plastics material as the discs 128 and 130. Preferably, a number of plastic braces 138 are distributed evenly about the circumference of the tube 136 and strengthen the joint between the tube and the discs 128 and 130.

The inner section 125 is constructed of similar materials as the outer section 124. It includes an outer disc member 140, a high density polyurethane core 142 and a central tubular member 144. The side of the inner section 125 opposite the disc 140 is a conical part 146 which of course is fixedly arranged on the inner section 125. This conical part is part of a driven conical mechanism used to rotate the rear wheel. This mechanism includes driven conical member 148 which can be constructed in the same manner as the outer conical member 88 shown in FIG. 10. The control cable 110 is connected to a yoke member which is connected to a thrust bearing in the same manner as illustrated in FIG. 10. It will be appreciated that in this advantageous construction, the conical part 146 constitutes a conical member which is a central part of the bicycle wheel 122. It will also be understood that the rear wheel 122 is mounted on a standard rear shaft (for example, the shaft 44 shown in FIG. 1) which supports the rear wheel. Again, suitable bearings and bushings will be arranged between the rear shaft and the central opening through the member 148 to permit this member to rotate on the rear shaft and also to slide in the axial direction thereon.

The drive belt will be fitted onto the drive system with a reasonable amount of tension. In this way, the belt itself will tend to push the conical members apart and this force will counteract the force applied by the control cable and the coil spring. The solid plastic wheel of FIG. 12 is preferred over a standard rear wheel construction employing a large number of metal spokes. With the construction of FIG. 12, one of the conical members can be formed on the rear wheel, making the wheel very aerodynamic and streamline, thereby lessening drag. The rear wheel could also be made hollow using two spaced apart plastic discs that would extend out to an extruded rim member. In such a hollow wheel design, internal ribs would be used in order to provide the necessary balance in an asymmetrical wheel design. One advantage of a plastic wheel construction is that it permits the use of tubeless tires.

It will be obvious to those skilled in this art that various modifications and changes can be made to the described drive system and bicycle without departing from the spirit and scope of this invention. Accordingly, all such modifications and changes that fall within the scope of the appended claims are intended to be included and to form part of this invention.

We claim:

1. A bicycle comprising:

a rigid frame including a steering post arranged forwardly on said frame;

a steerable front wheel;

means for rotatably mounting said front wheel to said frame including a steering spindle pivotally mounted in said steering post;

a rear wheel rotatably mounted on said frame;

foot powered drive means for said rear wheel including a first rotatable shaft extending transversely to said frame, a pair of conical drive members including a primary conical drive member, that is connected to said first shaft and rotated thereby about a first transverse axis, and a secondary conical drive member extending around said first shaft and coaxial therewith, said conical drive members each comprising a series of evenly spaced sectors with the sectors on one conical member being slidable between the sectors of the other conical member and each formed with side-by-side parallel grooves on said sectors, which grooves extend radially;

a rear shaft by which said rear wheel is mounted on said frame;

a driven conical mechanism connected to said rear wheel for rotating same, said mechanism including a driven conical member rotatably mounted on said rear shaft and slidable relative to said rear shaft along a second transverse axis and a conical part connected to said rear wheel and coaxial therewith, said driven conical member and said conical part each comprising a series of evenly spaced sectors with the sectors of the driven conical member being slidable between the sectors of said conical part and each formed with side-by-side parallel grooves on said sectors, which grooves extend radially;

a continuous V-shaped belt extending about said pair of conical drive members and said driven conical mechanism, said belt being formed with side-by-side parallel grooves that extend perpendicular to the length of the drive belt and that mate with and engage said parallel grooves on said conical drive members, said driven conical member, and said conical part; and control means for simultaneously causing relative sliding movement of said pair of conical drive members and said driven conical mechanism whereby an effective circumference of said pair of conical drive members for engagement with said drive belt is increased while an effective circumference of said driven conical mechanism for engagement with said drive belt is correspondingly decreased by operation of said control means and vice versa, wherein a variable drive for said bicycle is provided by means of said conical drive members and said conical mechanism.

2. A bicycle according to claim 1 wherein said sectors of each conical drive member define a cone whose surface extends at an angle of between 45 and 85 degrees relative to said first transverse axis.

3. A bicycle according to claim 1 wherein said drive belt is hollow and contains fibre reinforcements in walls forming sides of said drive belt.

4. A bicycle according to claim 1 wherein said control means includes first and second control cables connected respectively to one of said conical drive members and said driven conical member and a single lever control member connected to one end of each of said control cables, said control member being pivotally mounted on an upper portion of said bicycle.

5. A bicycle according to claim 1 wherein said sectors in the drive members each extend through an arc of between 10 and 20 degrees.

6. A bicycle according to claim 5 wherein said sectors in said driven conical member and said conical part each extend through an arc of between 10 and 20 degrees.

7. A bicycle according to claim 1 wherein said sectors of each conical drive member define a cone whose surface extends at an angle of between 45 and 85 degrees relative to said first transverse axis.

8. A bicycle according to claim 7 wherein said sectors of said driven conical member and said conical part define two cones each of whose surfaces extend at an angle of between 45 and 85 degrees relative to said second transverse axis.

9. A bicycle comprising:

a rigid frame including a steering post arranged forwardly on said frame;

a steerable front wheel;

means for rotatably mounting said front wheel to said frame including a steering spindle pivotally mounted in said steering post;

a rear wheel rotatably mounted on said frame;

foot powered drive means for said rear wheel including a first rotatable shaft extending transversely to said frame, a pair of conical drive members including a primary conical drive member, that is connected to said first shaft and rotated thereby about a first transverse axis, and a secondary conical drive member extending around said first shaft and coaxial therewith, said conical drive members each comprising a series of evenly spaced sectors with the sectors on one conical member being slidable between the sectors of the other conical member;

a rear shaft by which said rear wheel is mounted on said frame;

a driven conical mechanism connected to said rear wheel for rotating same, said mechanism including a driven conical member rotatably mounted on said rear shaft and slidable relative to said rear shaft along a second transverse axis and a conical part connected to said rear wheel and coaxial therewith, said driven conical member and said conical part each comprising a series of evenly spaced sectors with the sectors of the driven conical member being slidable between the sectors of said conical part;

a continuous V-shaped belt extending about said pair of conical drive members and said driven conical mechanism; and control means for simultaneously causing relative sliding movement of said pair of conical drive members and said driven conical mechanism whereby an effective circumference of said pair of conical drive members for engagement with said drive belt is increased while an effective circumference of said driven conical mechanism for engagement with said drive belt is correspondingly decreased by operation of said control means and vice versa, wherein a variable drive for said bicycle is provided by means of said conical drive members and said conical mechanism, said control means including at least one control cable connected to either one of said conical drive members or said driven conical member and a control member connected to one end of said at least one control cable, said control member being mounted on an upper portion of said bicycle, wherein said at least one control cable is connected to a pivoting yoke member and a thrust bearing is mounted either on an inner one of the conical drive members or on said driven conical member, said yoke member being connected to said thrust bearing so as to be capable of moving the thrust bearing in an axial direction along said first or second transverse axis.

10. A drive system capable of providing various drive ratios comprising:
   first and second pairs of conical members, each pair including primary and secondary conical members both of which are rotatable about a first or second transverse axis, said conical members each comprising a series of evenly spaced sectors with the sectors of the primary conical member being slidable between the sectors of the secondary conical member in each pair and each conical member formed with side-by-side parallel grooves that extend radially;
   a first shaft for rotating said first pair of conical members, at least one of said first pair of conical members being connected for rotation with said first shaft;
   means for mounting said primary conical member of the first pair for sliding movement relative to said first shaft along said first transverse axis;
   a second shaft having an axial center line that is aligned with said second transverse axis, said second pair of conical members being mounted on said second shaft,
   at least one of said second pair of conical members being mounted for sliding movement relative to the other conical member of the second pair along said second transverse axis;
   a continuous V-shaped drive belt extendible about both pairs of conical members, said drive belt being formed with side-by-side parallel grooves that are perpendicular to the length of the drive belt and that mate with and engage the grooves on said conical members; and
   control means for simultaneously causing relative sliding movement of both said first and second pairs of conical members whereby an annular region of engagement between the drive belt and the first pair of conical members can be increased in circumference while an annular region of engagement between the drive belt and the second pair of conical members can be correspondingly decreased by suitable operation of said control means and vice versa.

11. A drive system according to claim 10 wherein manually or feet operated cranks are rigidly connected to said first shaft for rotating same.

12. A drive system according to claim 10 wherein said control means includes spring means to bias one of the conical members of each pair towards the other conical member in an axial direction along said first or second transverse axis.

13. A drive system according to claim 10 wherein said control means includes first and second control cables connected respectively to one of said conical members of said first and second pairs and a single lever control member connected to one end of each control cable and adapted to be pivotally mounted on a suitable support.

14. A drive system according to claim 10 wherein said sectors each extend through an arc of between 10 to 20 degrees.

15. A drive system according to claim 10 wherein one conical member of each pair has a short tubular member that is coaxial with the respective first or second transverse axis and that is rigidly connected to the centre of said one conical member, and each short tubular member is axially slidable in another tubular member formed at the center of the other conical member of the respective pair.

16. A bicycle drive system capable of providing various drive ratios comprising:
   a bicycle wheel comprising a radially outer section and a radially inner section, said outer section being free to rotate in one direction relative to said inner section;
   first and second pairs of conical members, each pair including primary and secondary conical members both of which are rotatable about a first or second transverse axis, said conical members each comprising a series of evenly spaced sectors with the sectors of the primary conical member being slidable between the sectors of the secondary conical member in each pair, said secondary conical member of the second pair being formed by said inner section of the bicycle wheel;
   a first shaft for rotating said first pair of conical members, at least one of said first pair of conical members being connected for rotation with said first shaft;
   means for mounting said primary conical member of the first pair for sliding movement relative to said first shaft along said first transverse axis;
   a second shaft having an axial center line that is aligned with said second transverse axis, said bicycle wheel and said second pair of conical members being mounted on said second shaft,
   at least one of said second pair of conical members being mounted for sliding movement relative to the other conical member of the second pair along said second transverse axis;
   a continuous V-shaped drive belt extendible about both pairs of conical members; and
   control means for simultaneously causing relative sliding movement of both said first and second pairs of conical members whereby an annular region of engagement between the drive belt and the first pair of conical members can be increased in circumference while an annular region of engagement between the drive belt and the second pair of conical members can be correspondingly decreased by suitable operation of said control means and vice versa.

17. A drive system capable of providing various drive ratios comprising:
   first and second pairs of conical members, each pair including primary and secondary conical members both of which are rotatable about a first or second transverse axis, said conical members each comprising a series of evenly spaced sectors with the sectors of the primary conical member being slidable between the sectors of the secondary conical member in each pair;

a first shaft for rotating said first pair of conical members, at least one of said first pair of conical members being connected for rotation with said first shaft;

means for mounting said primary conical member of the first pair for sliding movement relative to said first shaft along said first transverse axis;

a second shaft having an axial center line that is aligned with said second transverse axis, said second pair of conical members being mounted on said second shaft, at least one of said second pair of conical members being mounted for sliding movement relative to the other conical member of the second pair along said second transverse axis;

a continuous V-shaped drive belt extendible about both pairs of conical members; and control means for simultaneously causing relative sliding movement of both said first and second pairs of conical members whereby an annular region of engagement between the drive belt and the first pair of conical members can be increased in circumference while an annular region of engagement between the drive belt and the second pair of conical members can be correspondingly decreased by suitable operation of said control means and vice versa, said control means including a control cable, a pivoting yoke member connected to one end of said control cable, and a thrust bearing mounted on the sliding conical member of said first or second pair, said yoke member being connected to said thrust bearing so as to be capable of moving the thrust bearing in an axial direction along said first or second transverse axis.

18. A drive system according to claim 17 wherein each conical member is disc shaped on one side and conical on an opposite side, said sectors being formed on said conical side, and wherein said one side and opposite side meet along a common circular periphery.

19. A drive system capable of providing various drive ratios comprising:

first and second pairs of conical members, each pair including primary and secondary conical members both of which are rotatable about a first or second transverse axis, said conical members each comprising a series of evenly spaced sectors with the sectors of the primary conical member being slidable between the sectors of the secondary conical member in each pair;

means for selectively moving said first pair of conical members axially towards each other along the first transverse axis;

a central support tube rigidly connected to said primary conical member of the first pair and coaxial with said first pair of conical members, said tube having first helical engagement means extending around an inner surface of said tube;

a first shaft for rotating said first pair of conical members and extending through said support tube, said first shaft having second helical engagement means extending around its perimeter and in engagement with said first helical engagement means, said primary conical member of the first pair being mounted for rotation under applied torque about the first shaft;

a second shaft having a central axis aligned with said second transverse axis, said second pair of conical members being mounted for rotation on said second shaft;

means for mounting said second pair of conical members for sliding movement relative to one another along said second transverse axis;

a continuous V-shaped drive belt extendible about both pairs of conical members; and a slave-type control mechanism operatively connected between the two pairs of conical members whereby relative axial movement of the first pair of conical members in one axial direction results in a similar but opposite relative axial movement of the second pair of conical members, wherein said first and second helical engagement means are arranged and constructed to cause said first pair of conical members to move away from one another with an increase in torque applied to said first shaft and said moving means are capable of moving said first pair closer to one another when the torque applied to said first shaft decreases.

20. A drive system according to claim 19 wherein said first helical engagement means is a helical groove and the second helical engagement means is a helical rib.

21. A drive system according to claim 19 wherein said moving means includes a coil spring acting on a thrust bearing mounted on said primary conical member of said first pair.

22. A drive system according to claim 19 wherein said sectors of said conical members are all formed with side-by-side parallel grooves that extend generally radially and said drive belt is also formed with side-by-side parallel grooves that are perpendicular to the length of the drive belt and that mate with and engage the grooves in said sectors.

23. A drive system according to claim 19 wherein said sectors in said conical members each extend through an arc of between 10 and 20 degrees.

* * * * *